(12) United States Patent
Hothi et al.

(10) Patent No.: US 8,434,710 B2
(45) Date of Patent: May 7, 2013

(54) AIRCRAFT

(75) Inventors: Inderpal Singh Hothi, Farnborough (GB); Jon Robert Stoackley, Salisbury (GB); Steven John Stoackley, Salisbury (GB)

(73) Assignee: Qinetiq Limited, Farnborough (GB)

( * ) Notice: Subject to any disclaimer, the term of this patent is extended or adjusted under 35 U.S.C. 154(b) by 143 days.

(21) Appl. No.: 12/740,005

(22) PCT Filed: Nov. 20, 2008

(86) PCT No.: PCT/GB2008/003890

§ 371 (c)(1),
(2), (4) Date: Apr. 27, 2010

(87) PCT Pub. No.: WO2009/066073

PCT Pub. Date: May 28, 2009

(65) Prior Publication Data

US 2010/0252690 A1   Oct. 7, 2010

(30) Foreign Application Priority Data

Nov. 21, 2007  (GB) .................................. 0722817.4
Jan. 18, 2008  (GB) .................................. 0800897.1

(51) Int. Cl.
*B64C 27/22*   (2006.01)

(52) U.S. Cl.
USPC ........................................ 244/7 B; 244/17.23

(58) Field of Classification Search ............... 244/7 R, 244/7 A, 7 B, 12.4, 12.5, 17.11, 17.23
See application file for complete search history.

(56) References Cited

U.S. PATENT DOCUMENTS

| | | | |
|---|---|---|---|
| 2,743,886 A * | 5/1956 | Driggs et al. .................. | 244/7 B |
| 3,350,035 A * | 10/1967 | Schlieben ..................... | 244/7 R |
| 3,514,052 A | 5/1970 | McKeown | |
| 4,088,284 A | 5/1978 | Caswell | |
| 5,289,994 A | 3/1994 | Del Campo Aguilera | |
| 5,765,783 A | 6/1998 | Albion | |
| 6,398,157 B1 * | 6/2002 | Ingram ........................ | 244/7 B |
| 2006/0011777 A1 | 1/2006 | Arlton et al. | |

FOREIGN PATENT DOCUMENTS

GB   600374   10/1945

OTHER PUBLICATIONS

British Search Report issued in Application No. 0800897.1; May 21, 2008.
British Office Action issued in Application No. 0800897.1; Apr. 29, 2008.
International Search Report issued in Application No. PCT/GB2008/003890; Mailed on Mar. 26, 2009.
Written Opinion of the International Searching Authority issued in Application No. PCT/GB2008/003890; Mailed on Mar. 26, 2009.
"Announcement" *Aviation Week and Technology*, vol. 142, No. 19, p. 17, May 8, 1995.

* cited by examiner

*Primary Examiner* — Timothy D Collins
*Assistant Examiner* — Jamie S Stehle
(74) *Attorney, Agent, or Firm* — Oliff & Berridge, PLC

(57) ABSTRACT

An unmanned aerial vehicle (UAV) in the form of a "tail sitter" flying wing adapted for vertical take off and landing and transitions between flight as a helicopter and wing-borne flight. The vehicle is electrically powered from onboard batteries and equipped with rotors on miniature helicopter rotor heads at the tips of the wing for both lift, during take off and landing, and forward thrust. In planform the wing comprises, to each side of its longitudinal axis, an inner section with swept back leading and trailing edges, and an outer section with a leading edge more perpendicular to the longitudinal axis, being only mildly swept back or substantially unswept, and a swept forward trailing edge.

17 Claims, 4 Drawing Sheets

AIRCRAFT

BACKGROUND

The present invention relates to aircraft. The invention is more particularly (though not exclusively) concerned with unmanned aerial vehicles (UAVs) and it is in the context of aircraft of this class that the invention will be more particularly described hereinafter. Such vehicles may be used primarily by military forces e.g. for airborne (or in the case of preferred embodiments of the present invention also ground-based) surveillance, reconnaissance, communications relay or the like duties, but may also have civilian applications such as for road traffic monitoring, ground mapping, aerial photography and so forth.

SUMMARY

In one aspect the invention seeks to provide a UAV of relatively simple and inexpensive construction which is highly manoeuvrable and capable of take off and landing without any prepared runway, and shares the attributes of both helicopter and fixed wing types.

In this aspect the invention accordingly resides in an aircraft comprising a fixed wing airframe equipped with a pair of contra-rotatable rotors positioned to provide forward thrust for wing-borne flight; means for controlling the collective and cyclic pitch of the blades of said rotors; and means by which the aircraft can stand on the ground with the chord direction of said wing and the axes of rotation of said rotors pointing upwards; whereby the aircraft is capable of vertical take off and landing and flight as a helicopter under lift produced by said rotors, capable of wing-borne flight under thrust produced by said rotors, and capable of transition between such helicopter and wing-borne flight without tilting of said rotor axes relative to said wing or tilting of said wing relative to the remainder of the airframe (if any).

A preferred feature of the invention is that in planform the wing of such an aircraft comprises, to each side of its longitudinal axis, an inner section with a swept back leading edge and an outer section with a leading edge more perpendicular to said longitudinal axis. This can achieve a favourable location of the centre of gravity relative to the centre of lift for pitch stability in wing-borne flight. Moreover by mounting the rotors on the more perpendicular outer wing sections they need be supported only a short distance ahead of the leading edges of those sections for safe clearance across the whole of the rotor discs (provided that the discs do not also project into the spaces ahead of the respective adjacent swept inner sections), thereby minimising the torsion loads which they impose on the wing structure and consequently the strength and weight of the structure required to support those loads. More particularly the leading edges of the outer wing sections are preferably only mildly swept back (say not more than 5° measured from a transverse axis) or substantially unswept.

The trailing edges of the inner wing sections may also be swept back, and may be at substantially the same angle as the leading edges of those sections, while the trailing edges of the outer wing sections may be swept forward.

In a preferred embodiment fins acting as vertical stabilising surfaces (in the sense of forward wing-borne flight) are disposed substantially at the respective junctions between the inner and outer sections of the wing and the edges of these fins, or structure attached to these fins, may be used as the undercarriage of the aircraft by which it can stand on the ground for vertical take off and landing.

Another preferred feature of the invention, irrespective of the particular wing planform, is that the rotors are mounted substantially at respective tips of the wing. When the wing is of a planform as discussed above the rotors are therefore at an optimum position to ensure that their discs remain clear of the swept inner wing sections. In any event, however, by so disposing the rotors it can be arranged that the helical rotor wash tends to counteract the customary spillage of air from the high pressure to the low pressure surface of the wing at each tip. Substantially the whole of the area of the tip region can contribute to lift for wing-borne flight, therefore, meaning that a shorter and lighter wing can be employed than would otherwise be the case. Furthermore blowing the outboard regions of the wing in this way tends to delay stall at the tip which enhances the stability of the aircraft particularly during the transition from wing-borne to helicopter flight.

The airframe of an aircraft according to the invention is preferably in the form of a flying wing, i.e. tail-less, whether with or without a fuselage or the like centrebody. In any event a central pod may be provided extending forwardly from the wing which houses sensory, communications, navigational and/or control equipment.

The rotors of an aircraft according to the invention are preferably powered by an onboard electricity source, for example by respective batteries or fuel cells housed adjacent to the respective rotor.

In another aspect the invention resides in a method of roll control for a fixed wing aircraft, said aircraft being equipped with a pair of rotors spaced transversely of the aircraft to provide forward thrust for wing-borne flight and means for controlling at least the cyclic pitch of the blades of said rotors; wherein the aircraft is controlled in roll by controlling the pitch of said rotor blades cyclically to produce differential thrust between upper and lower sectors of the rotor discs, in opposite senses between said rotors.

In a further aspect the invention resides in a method of controlling an aircraft to hover over a fixed position in wind, said aircraft comprising a fixed wing airframe equipped with a pair of contra-rotatable rotors positioned to provide forward thrust for wing-borne flight and means for controlling the collective and cyclic pitch of the blades of said rotors, whereby the aircraft is capable both of flight as a helicopter under lift produced by said rotors and wing-borne flight under thrust produced by said rotors; the method comprising orienting the aircraft in helicopter flight with the span direction of the fixed wing generally normal to the wind and the aircraft tilted into the wind by cyclic control of the pitch of said blades so that said wing is at a high angle of attack to the wind flow and generates a component of lift to assist the lift of said rotors.

BRIEF DESCRIPTION OF THE DRAWINGS

These and other aspects and features of the present invention will now be more particularly described, by way of example, with reference to the accompanying drawings, in which.

DETAILED DESCRIPTION

Figure 1:
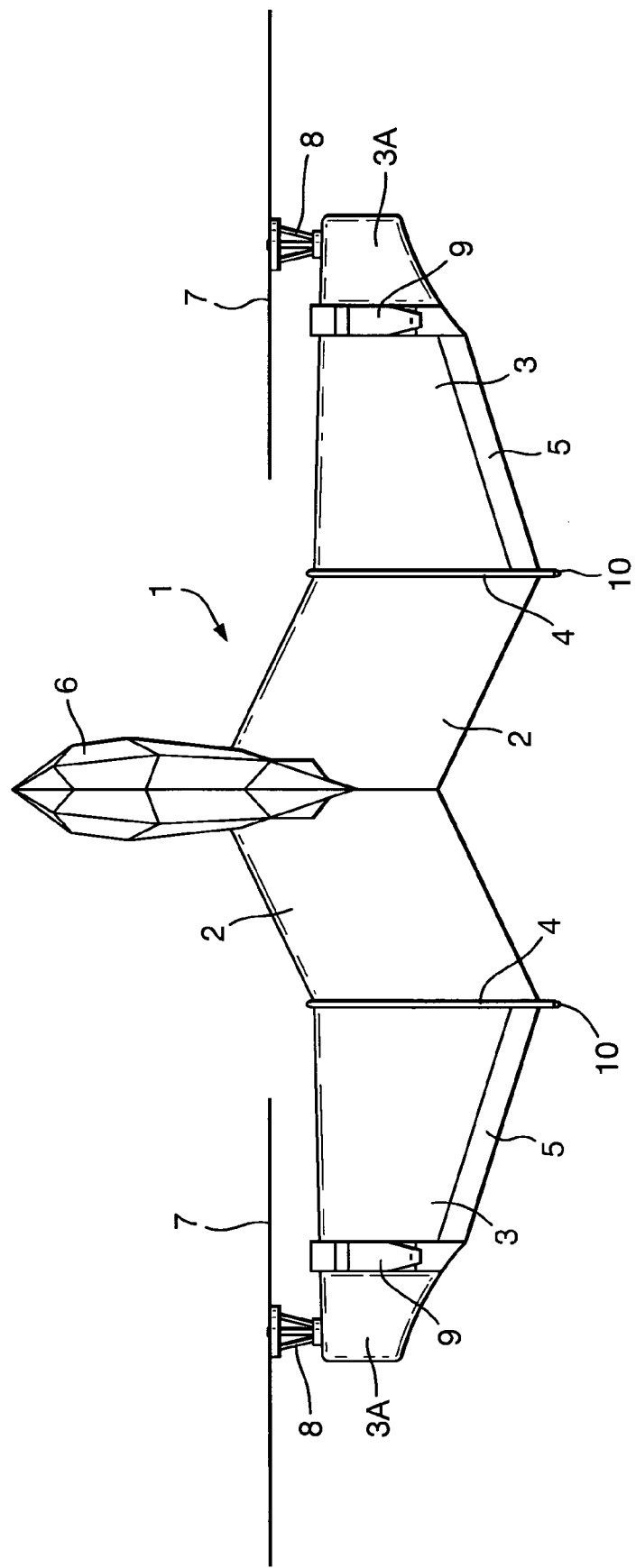
FIG. 1 is a plan view of a UAV in accordance with the invention, as in forward wing-borne flight.

The illustrated vehicle is a "tail sitter" vertical take off and landing (VTOL) UAV. It comprises a so-called flying wing 1, being in this case an aerofoil of reflex profile selected for high efficiency in forward flight and to provide a low "loitering" speed. In planform the wing has, to each side of its centreline (longitudinal axis), an inner section 2 which is swept back so that the centre of gravity of the vehicle and centre of lift of the wing 1 are appropriately located for pitch stability, and a straighter, generally trapezoidal outer section 3. In the illustrated embodiment both the leading and trailing edges of the inner wing sections 2 are swept back at an angle of approximately 25° (as measured from a transverse axis), while the leading edges of the outer wing sections 3 are swept back at only a shallow angle of around 2° and the trailing edges of those sections sweep forwards at an angle of approximately 18° for the most part, tapering further at the tips. A pair of vertical (in the sense of forward wing-borne flight of the vehicle) stabilising surfaces in the form of fins 4 extend upwardly from the wing 1, at the junctions between sections 2 and 3. In the illustrated embodiment the wing sections 3 are equipped with conventional elevons 5 for pitch and roll control during wing-borne flight, and which may also function as flaperons to provide additional lift at low airspeeds. The fins 4 may also be equipped with conventional control surfaces (not shown) for yaw control during wing-borne flight.

The wing 1 is of lightweight construction, predominantly comprising polypropylene (EPP) or Elapor™ foam, with a mix of balsa and plywood, and tubular carbon fibre reinforced composite spars, and covered in nylon reinforced tape.

A nose pod 6 extends forwardly from the apex of the wing 1 to house the vehicle's payload and other essential equipment as more particularly described hereinafter, and also contributes to its aerodynamic stability.

For flight propulsion the vehicle is equipped with a pair of contra-rotating rotors 7 mounted at the tips of the wing 1 on miniature helicopter rotor heads 8 which provide collective and cyclic rotor blade pitch control in known manner. The rotors are driven by electric motors, housed together with associated speed controllers in the tip portions 3A of the outer wing sections, and powered e.g. from lithium polymer batteries or fuel cells housed in adjacent pods 9. In another variant the wing 1 could be covered with photovoltaic cells to charge onboard batteries using solar energy and thereby extend the operational endurance of the vehicle.

Figure 2:
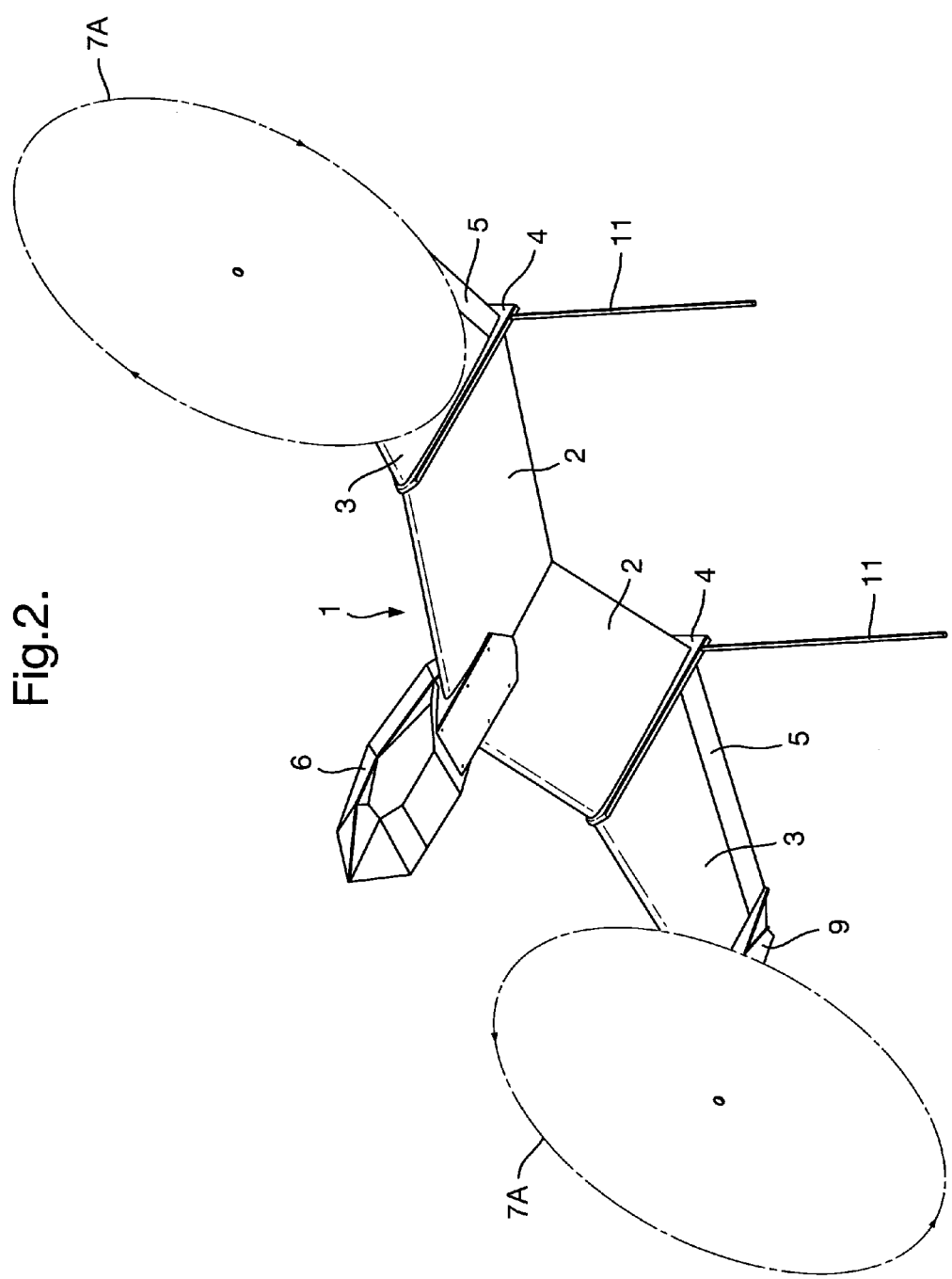
FIG. 2 is an isometric view of the vehicle of FIG. 1 from below, as in forward wing-borne flight.
Figure 3:
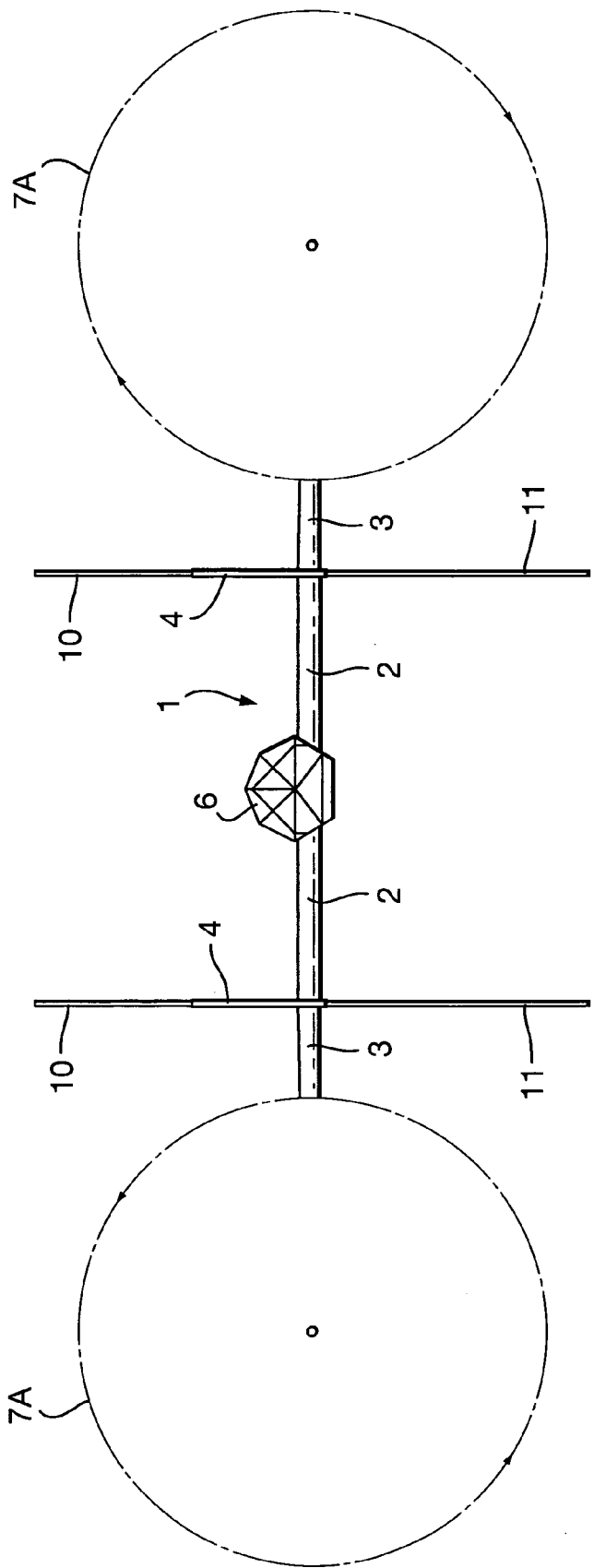
FIG. 3 is a front view of the vehicle of FIGS. 1 and 2, as in forward wing-borne flight.

The positioning of the rotors 7 at the tips of the wing means that the rotor discs (labelled 7A in FIGS. 2 and 3) are held well clear of the inner swept back wing sections 2 and, together with the minimal sweep of the outer section leading edges, means that the rotors need only be supported a short distance ahead of those leading edges to ensure that their discs are clear of the entire wing, thereby minimising the torsion loads which they impose on the wing structure and consequently the strength and weight of the structure required to support those loads. Furthermore by turning the rotors in these positions in the directions indicated in FIGS. 2 and 3—that is to say anticlockwise for the starboard rotor and clockwise for the port rotor as viewed from in front of the vehicle in wing-borne flight—the helical rotor wash at each tip tends to counteract the customary spillage of air from the high pressure (lower) surface to the low pressure (upper) surface of the wing at the tips. Substantially the whole of the area of the tip region can contribute to lift in wing-borne flight, therefore, meaning that a shorter and lighter wing can be employed than would otherwise be the case.

Figure 4:
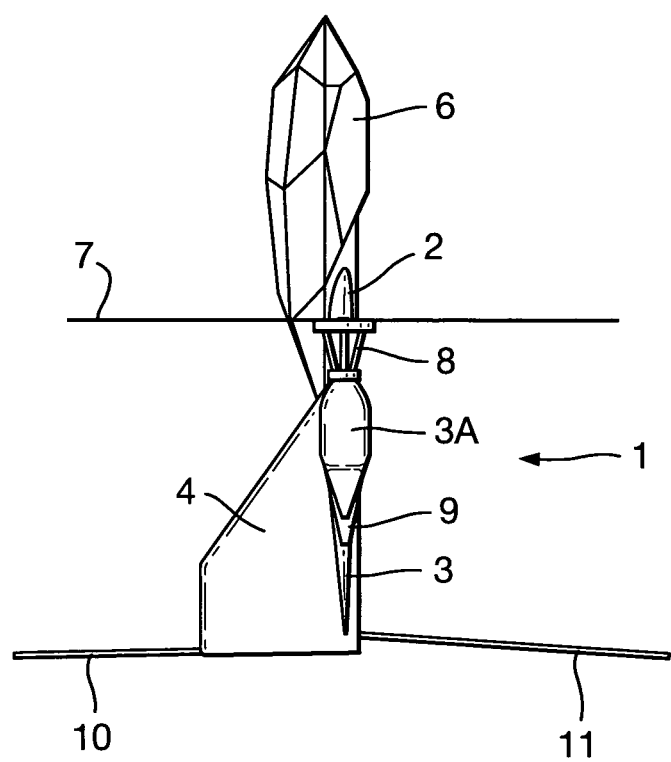
FIG. 4 is a side view of the vehicle of FIGS. 1 to 3, as if stood on the ground ready for take off or in a ground-based "sentry" mode.

Rods 10 and 11 of e.g. carbon fibre reinforced composite extend in opposite directions from the fins 4 to define a pair of landing feet by which the vehicle can stand on the ground with the chord direction of the wing 1 and the axes of rotation of the rotors 7 pointing upwards, as in FIG. 4. The vehicle can take off and land vertically from/to this condition under the lifting power of the rotors 7 and be flown as a double main rotor helicopter, including the ability to hover stably over a specified target area, with flight control being effected by variation of the rotor blade pitches both collectively and cyclically in known manner. The elevons 5 may also be employed for additional yaw control during operation in helicopter mode (yaw corresponding to a rotation about the vehicle centreline in this mode). In order to travel any significant distance, however, the vehicle will transition to conventional wing-borne forward flight, with the rotors 7 then acting as propellers to provide forward thrust, —this mode being substantially more efficient than the helicopter mode in terms of ground coverage and power utilisation—transitioning again to the helicopter mode with the rotors providing controlled lift (whether powered or autorotating) when landing is required. These and other flight manoeuvres may be under the control of an onboard autopilot module, with an associated GPS and inertial navigation system, all housed in the pod 6, to which specified altitudes, geographical coordinates and other mission parameters are fed over a telemetry link.

In order to transition from helicopter mode to wing-borne mode the vehicle may be flown in helicopter mode as if to the right as viewed in FIG. 4 and possibly also with an upward component, it being appreciated that the cyclic rotor blade pitch control will be set to tilt the rotor plane and the whole airframe to the right in the sense of that Figure to accomplish such motion, and with the result that the wing 1 is effectively placed at a high angle of attack to the relative airstream. Application of full "down" pitch control (in the sense of wing-borne flight) in this condition will raise the trailing edge of the wing and the transition to wing-borne flight will occur, accompanied by deceleration of the rotors 7 to a lower power setting appropriate to wing-borne flight.

In order to transition from wing-borne mode back to helicopter mode full "up" pitch control will be applied while in forward flight and gravity is allowed to rotate the airframe into the "tail sitting" attitude in which helicopter mode resumes, accompanied by acceleration of the rotors 7 to the higher power setting required for helicopter flight. In this respect by virtue of the rotor wash flowing over the outboard regions of the wings they are the last to stall as the vehicle approaches transition and there is accordingly no tendency for a tip to drop during this manoeuvre.

It is of note that the rotor axes remain in a fixed position relative to the rest of the airframe throughout the entire flight envelope with this vehicle as distinct from "tilt rotor" or "tilt wing" types in which transitions between helicopter and wing-borne flight are achieved by tilting the rotors, or rotors and wing, relative to the rest of the airframe, and the extra complexity, cost and weight of the mechanisms required to achieve transition with those types is thereby avoided.

As previously indicated the vehicle's payload will be housed in the pod 6, and it may include optical and/or thermal cameras and associated image processing software and/or other sensory devices as required by any particular mission. These may be mounted to "look down" from the vehicle when used for ground observation in forward flight but will be equipped with a gimbal mounting in the nose of the pod so as to be positioned at the highest available elevation and able to face in any desired direction when the vehicle is landed to act as a ground "sentry" in the orientation indicated in FIG. 4. In the latter respect a typical mission may comprise the stages of:

1. vertical take off from a command post or other safe location;
2. transition to wing-borne flight;
3. when reaching a target location the UAV will identify an area of interest using its onboard sensor suite;
4. transition back into vertical flight and landing at the desired remote location;
5. the UAV then enters a low power mode and essentially becomes a remote ground-based "sentry" using its sensors to gather intelligence about the surrounding area—this may be continuous or triggered by onboard motion detectors;
6. the UAV may remain on station in this mode for an extended period until the mission is complete;
7. the UAV then powers up and flies back to a designated location to land vertically with precision and minimal danger to the recovery personnel, transitioning again to/from wing-borne flight between the take off and landing phases.

While in "sentry" mode the vehicle may also sense for the approach of personnel e.g. using a passive infra red or ultrasonic based system, and be programmed to take off and return to base (or other designated location) if approached, to avoid the risk of capture or destruction of the vehicle. This sensor may also double as a ground proximity sensor used in flight to avoid the risk of ground impact and to ensure that the vehicle is at a safe height to perform certain manoeuvres.

One embodiment of a vehicle constructed as described herein may have a wingspan of around 2 m and an all up weight of around 3 kg including a payload of 500 g.

The presence of the helicopter rotor heads 8 with cyclic and collective blade pitch control has several useful implications also for the wing-borne flight mode of a vehicle according to the invention. Firstly, in order to make the rotors as efficient as possible during wing-borne flight the rotor heads can use collective control to appropriately match the pitch of the blades to the airspeed. Secondly, for yaw control during wing-borne flight differential collective pitch control across the two rotors to produce differential thrust may be used instead of control surfaces on the fins 4. Thirdly, further reductions in the weight and complexity of the vehicle can be achieved by using cyclic blade pitch control to replace the elevons 5 for airframe pitch and roll control, during wing-borne flight. That is to say for airborne pitch control the blades are controlled cyclically to produce a greater proportion of thrust in the upper half of the rotor disc than in the lower half, or vice versa, and generate corresponding pitching moments. For roll control the same cyclic control is applied except differentially across the two rotors to apply a pitch down moment at one wing tip and a pitch up moment at the other.

Another useful synergy which emerges from the vehicle's ability to produce lift from both the rotors 7 and wing 1 is as follows. While twin main rotor helicopters are conventionally flown forwards in a tandem arrangement, that is to say in a direction where one rotor leads and the other follows, the preferable mode of "forward" helicopter flight for a vehicle according to the invention is perpendicular to that direction, namely to the right as viewed in FIG. 4 with the span direction of the wing 1 generally normal to the relative airflow and tilted at a relatively high angle of attack by use of cyclic rotor blade pitch control. The wing will therefore produce some lift with a component in the vertical direction under these conditions, thereby contributing to the lift required to maintain the vehicle in the air even while in helicopter mode, thus reducing the power required to the rotors and conserving the vehicle's energy supply. Similarly during hovering flight in windy conditions the vehicle can be manoeuvred by the rotors to fly into the wind in this attitude at a matched speed to remain on station above a fixed ground position, with a component of lift generated by the wing to assist the lift of the rotors.

It will be appreciated that for the vehicle described herein all of the electrical and electronic components required for its propulsion, control, navigation and communications, together with its sensory payload, are clustered in just three locations, namely the pod 6 and the two wing tip regions. A respective single wiring loom extends through the wing structure from each tip to the pod 6. This arrangement confers a substantial degree of protection to the confined functioning of the vehicle under weapons fire as only a small percentage of the airframe houses vulnerable components. The majority of its surface area is represented by the foam core and nylon covering of the wing 1 and this form of construction has itself been found to be capable of withstanding weapons fire; the tendency is for bullets to pass straight through the material with little disruption and for the material to be effectively self sealing.

The design of the vehicle also lends itself to a modular form of construction with each of the nose pod 6, wing sections 2 and 3 and fins 4 being separable and replaceable, with appropriate electrical connectors being provided between the components 6, 2 and 3. The tip portions 3A of the wing sections 3 which carry the propulsion units may similarly be separable and replaceable with respect to the remainder of those wing sections.

The invention claimed is:

1. An aircraft comprising
a fixed wing airframe equipped with a pair of contra-rotatable rotors positioned to provide forward thrust for wing-borne flight, both the collective and cyclic pitch of blades of said rotors being controllable in use; and
structure by which the aircraft can stand on a ground with a chord direction of said wing and an axes of rotation of said rotors pointing upwards, wherein
the aircraft is capable of vertical take off and landing and flight as a helicopter under lift produced by said rotors, capable of wing-borne flight under thrust produced by said rotors, and capable of transition between such helicopter and wing-borne flight without tilting of said rotor axes relative to said wing or tilting of said wing relative to the remainder of the airframe,
said fixed wing includes a leading edge, a trailing edge and tips, and
said rotors are mounted substantially at respective tips of said wing.

2. An aircraft according to claim 1 wherein in planform said wing comprises, to each side of a longitudinal axis of the wing, an inner section with a swept back leading edge and an outer section with a leading edge that is more perpendicular to said longitudinal axis than the swept back leading edge of the inner section.

3. An aircraft according to claim 2 wherein the leading edges of said outer sections are swept back by less than 5° or substantially unswept.

4. An aircraft according to claim 2 wherein the trailing edges of said inner sections are swept back.

5. An aircraft according to claim 4 wherein the sweep angles of the leading and trailing edges of said inner sections are substantially the same.

6. An aircraft according to claim 2 wherein the trailing edges of said outer sections are swept forward.

7. An aircraft according to claim 2 comprising stabilizing fins disposed substantially at respective junctions between said inner and outer sections of said wing.

8. An aircraft according to claim 7 wherein said structure by which the aircraft can stand on the ground comprises or is attached to said fins.

9. An aircraft according to claim 2 wherein discs defined by rotation of said rotors do not project substantially in front of the respective adjacent inner sections of said wing.

10. An aircraft according to claim 1 wherein said airframe is in the form of a flying wing.

11. An aircraft according to claim 1 comprising a central pod extending forwardly from said wing and housing at least one of sensory, communications, navigational and control equipment.

12. An aircraft according to claim 1 wherein said rotors are powered by an onboard electricity source.

13. An aircraft according to claim 12 wherein said rotors are powered by respective batteries or fuel cells housed adjacent to the respective rotor.

14. An aircraft according to claim 1, being an unmanned aerial vehicle.

15. A method of roll control for a fixed wing aircraft according to claim 1, wherein
the aircraft is controlled in roll by controlling pitch of said rotor blades cyclically to produce differential thrust between upper and lower sectors of rotor discs in opposite senses between said rotors.

16. A method of controlling an aircraft to hover over a fixed position in wind, said aircraft comprising a fixed wing airframe equipped with a pair of contra-rotatable rotors positioned to provide forward thrust for wing-borne flight, both collective and cyclic pitch of blades of said rotors being controllable in use, whereby the aircraft is capable both of flight as a helicopter under lift produced by said rotors and wing-borne flight under thrust produced by said rotors, the method comprising
orienting the aircraft in helicopter flight with the span direction of the fixed wing generally normal to the wind and the aircraft tilted into the wind by cyclic control of the pitch of said blades so that said wing is at a high angle of attack to the wind flow and generates a component of lift to assist the lift of said rotors,
wherein
a chord direction of said wing and axes of rotation of said rotors point upwards,
said fixed wing includes a leading edge, a trailing edge and tips, and
said rotors are mounted substantially at respective tips of said wing.

17. A method according to claim 15, wherein:
the pair of rotors are contra-rotatable;
the cyclic pitch and a collective pitch of the blades of said rotors are controllable in use;
the aircraft further comprises structure by which the aircraft can stand on the ground with a chord direction of said wing and axes of rotation of said rotors pointing upwards; and
the aircraft is capable of:
vertical take off and landing and flight as a helicopter under lift produced by said rotors,
wing-borne flight under thrust produced by said rotors, and
transition between said helicopter and wing-borne flight without tilting of said rotor axes relative to said wing or tilting of said wing relative to a remainder of the airframe.

\* \* \* \* \*